(12) United States Patent
Prieto (10) Patent No.: US 8,044,288 B1
(45) Date of Patent: Oct. 25, 2011

(54) PROPRIETARY MUSIC ROTATION SUPPORTING THE EQUAL TEMPERAMENT TUNING SYSTEM

(76) Inventor: Enrique Prieto, North Miami Beach, FL (US)

( * ) Notice: Subject to any disclaimer, the term of this patent is extended or adjusted under 35 U.S.C. 154(b) by 36 days.

(21) Appl. No.: 12/462,460

(22) Filed: Aug. 4, 2009

(51) Int. Cl.
*G09B 15/00* (2006.01)
(52) U.S. Cl. ..................................... 84/470 R
(58) Field of Classification Search ............... 84/470 R
See application file for complete search history.

(56) References Cited

U.S. PATENT DOCUMENTS

| | | | | |
|---|---|---|---|---|
| 5,146,833 A | * | 9/1992 | Lui | 84/462 |
| 6,459,029 B2 | * | 10/2002 | Uehara | 84/477 R |
| 6,831,219 B1 | * | 12/2004 | Bonham | 84/483.2 |
| 7,094,962 B2 | * | 8/2006 | Kayama | 84/609 |
| 7,251,530 B1 | * | 7/2007 | Overstreet et al. | 607/55 |
| 7,394,013 B2 | * | 7/2008 | Fallgatter | 84/645 |
| 2010/0011938 A1 | * | 1/2010 | Adams | 84/470 R |

FOREIGN PATENT DOCUMENTS

| | | | | |
|---|---|---|---|---|
| JP | 02071291 A | * | 3/1990 | |
| JP | 2005128461 A | * | 5/2005 | |

\* cited by examiner

*Primary Examiner* — Jianchun Qin
(74) *Attorney, Agent, or Firm* — David W. Barman (57) ABSTRACT

A musical notation system is provided wherein the twelve pitches of the 12-TET tuning system are represented by horizontal lines placed at the top, center and bottom of four different reference heads. Pitches, intervals chords and scales degrees are named by the positions of these lines at the reference heads and by the relationship between them. Assistant is provided to performers by representing the correlation between these reference heads and positions or keys in the musical instruments as well as a method to aid identify intervals, scale degrees and pitches. Relative note-on is represented in a timing row with demarcation of beats and measures; note-off is represented by the end of the lines as a proportional indication of the duration of sound.

11 Claims, 7 Drawing Sheets

S4      20 — it belongs to S5

FIG. 4 bi   mi   ti   bo   mo   to   ba   ma   ta   be   me   te

FIG. 5 sa   se   si   so   sii   saa   se      see   se

FIG. 6 na   ne   ni   no   naa   ni   na

PROPRIETARY MUSIC ROTATION SUPPORTING THE EQUAL TEMPERAMENT TUNING SYSTEM

CROSS-REFERENCE TO RELATED APPLICATIONS

This application claims the benefit of provisional patent application Ser. No. 61/137,180, filed 2008 Jul. 28 by the present inventor.

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

FIELD OF THE INVENTION

This invention relates to the representation, performance, perception, and theory of music, specifically to the interface with music and musical instruments.

BACKGROUND OF THE INVENTION

Computers are great tools for music, when properly commanded they are extraordinary performers of musical instruments, they can also help us in the creation, production and analysis of music.

The Standard Music Notation (SMN) is one of the means used as an interface to communicate with them because it is the universally known and widely accepted notation system, however it is limited and laborious for this task since it evolved long before this technological era and was not intended at all for those purposes, on the other hand the languages such as CAL, encoding systems or files formats such as MIDI that have been created for computers and music are very powerful but unsuitable for human performance or the traditional musical practice.

The piano roll notation is widely used by computer sequencers to display and edit as-performed timing information in a graphical way but it is also unsuitable for human performance and lacks of theoretical support.

The Standard Music Notation is the result of several centuries of evolution, then intended to represent music based on exact-integer-ratio tuning concepts and diatonic scales; it has been an indissoluble part of the theory of music, together they followed and supported the then tuning standard as it struggled to develop, alone the way tuning system, notation and theory formed a perfect and solid braid that could not be broken or significantly modified by the time the battle for temperament ended.

As a result of that battle we have a theoretically simpler and ingeniously well-calculated tuning system, which was slowly assimilated, and treated as a modification of the fading system. This made possible that we could merge the new tuning system with the existing notation and theoretical support, and continue using them even when that harmony or concord with notation and theory do not exist with the twelve-tone equal temperament system (12-TET).

Consequentially we were forced to go on thinking of music through the theory and concepts created to support another tuning system, not with a proprietary one, we could go on this way for ever but the huge musical illiteracy and semi-literacy disproportion that we have today will also remain the same.

Or we could take advantage of the much simple concept of the current standard that would represent to music theory, music perception and in general to the musical practice the equivalent of what equal temperament did to performance in the fixed tone musical instruments many years ago.

We gave a solid forward step adopting the 12-TET as a standard, sacrificing a little bit of beauty to get a lot of functionality and thanks to technology we are ready for the next necessary step in the same direction and consolidate a complete proprietary system for the current tuning standard and the musical practice and music literacy could be for the masses.

There have been many proposals to modify the SMN focusing on the representation of music alone to make easier reading and playing by eliminating the so called unnecessary complications of the SMN; however there are also unnecessary complicated theoretical concepts related to those of representation when some notes are considered accidentals of another and they are not anymore.

It has almost been exhausted variants of the lines and spaces idea, using a variety of resources to represent sharps and flats but keeping the concept alive or do not provide a proprietary theoretical support.

Besides simplification for reading and playing, a modern notation system should also form a solid braid with a proprietary theoretical support for the 12-TET, so that we could have the possibility of completely get rid of unwanted and complicated legacy, it should exceed the possibilities of the SMN and be oriented to technology.

As language music belongs to everybody, so should be the possibility of literacy which is the right way to the musical practice, not necessarily as a profession, to achieve this, a complete alternative solution is not an option, it is the only way.

BRIEF SUMMARY OF THE INVENTION

It is therefore an object of the present invention is to provide a music notation solution compromising the opposite possibilities and limitations of humans and computers, to provide basic and simple musical information for humans and at the same time it could be used as a more accurate and friendly interface for computer applications, intending to be a better link between people, music and technology.

It is another object to occupy the position that was created after the acceptance of the 12-TET tuning system as a standard and the invention of computers; these two major and remarkable events deserve a system created with them in mind, which should be a continuation of the necessary simplification of the musical practice, which seems to have come to an end without solution and has been consider a lost battle trying to reform the SMN.

It is another object to simplify our interface with music and help improving music perception, to make music literacy a common practice.

It is another object to provide an alternative music notation solution that unify and exceeds the functionality of the standard and the piano roll notations.

It is another object to give the 12-TET tuning system a proprietary theoretical support and have the opportunity of releasing our minds of ties with previous tuning concepts.

It is another object to have a more suitable notation-like way of commanding computers for performance, creation, production and analysis of music.

It is another object to open new possibilities to explore and control the complicated relations created by the web of pitches from different perspectives, not just the traditional one when providing names for pitches, intervals, chords and degrees of scales based on a consistent relationship.

It is another object to provide equal support for all genres of music, which are made using some or all of the twelve notes of the series, independent of scales or tonality.

It is another object to provide equal support for the absolute (pitch) and relative (intervals and degrees of scales) schools of music to take advantage of each method benefits.

It is another object to provide a closer relation between representation and codification of music to generate clean and accurate visual representation of music out of instruments performance or digital music files with minimum or no human intervention.

It is another object to aid in the perception and performance of music, making the activities of instruments performance and reading or writing music cooperate to improve each other.

It is another object to unify the representation of pitch for all musical instruments to eliminate transposition, providing a consistent representation.

It is another object to provide assistant for performance in traditional or new musical instruments especially for strings and keyboards by representing the correlation between the reference heads used for representation and the keys or string positions that generate the correlated pitches.

It is another object to provide a method that will cooperate to develop the skills of equally using pitches, intervals or degrees of the scales in the musical practice.

It is another object to provide a set of symbols as a logically related series, so that they have isolated use and meaning and a consistent useful relationship to each other.

It is another object to provide names according to representation so that names generate the symbolic representation and representation generates the name.

It is another object that the same methods used to represent music are the foundation for a personal stenographic system, notation and computer high-level language for music.

DETAILED DESCRIPTION OF THE INVENTION

This is how to represent the musical pitches and how to name them.

The present invention supports the 12-TET concept, which equally distributes the twelve-note scale and makes every note equally important; the absolute value of those notes or pitches has been defined by the concert pitch standard.

In the present invention music can be written in any of four directions, up-down, down-up, left-right or right to left, by default it will be written horizontally from left to right which is the recommended direction and all the description and examples will be using that direction, the term by default means that there is no need of indication and that by the use of commands or indications alternative methods may be used.

There are about ten different frequencies for what we perceive as the same pitch in the whole range of musical instruments, which means there are about ten series of twelve basic pitches each in our current standard tuning system.

Figure 1:
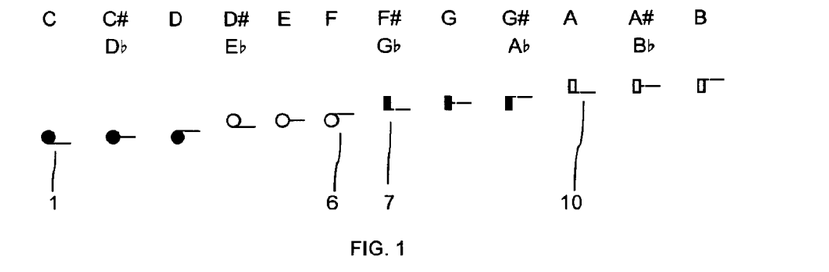
FIG. 1 illustrates the twelve notes of the chromatic scale.

The set of twelve stand-alone symbols in FIG. 1 by default represent the twelve basic pitches of those series, FIG. 1 10 represent all the "A" notes and the others correlate to their equivalent in this order to the twelve-notes or chromatic scale.

Determining one of these symbols as the reference to the others, these symbols also represent the musical intervals or the degrees of a scale when indicated by a command; this is especially useful in functions of a computer high level language embodiment.

Figure 2:
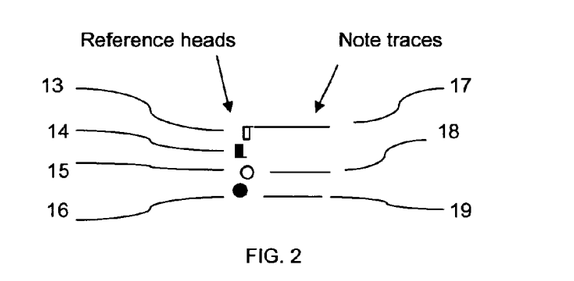
FIG. 2 illustrates the reference heads pattern and the note trace positions.

These symbols have been created out of the combination of the four reference heads in FIG. 2 16, 15, 14 and 13 with three positions for the horizontal lines; FIG. 2 19 bottom, 17 top and 18 center, these lines (note traces, hereafter) are the one actually representing the pitches or musical notes and the heads are the reference to discriminate them.

This method is used for the consistent and direct representation of each pitch, they are directly associated with the keys, positions or fingering in the musical instruments that generate them, we are not forced to use names as intermediaries and as there is no legacy we can unify the representation of pitch for all the musical instruments to eliminate transposition.

However there is a name for each pitch, they have been determined by the combination of the note traces positions in the reference heads; there is a different consonant for each note trace position followed by an exclusive vowel for each reference head to discriminate them, the consonants are:

"b" for all bottom positions FIG. 2 19
"m" for all middle positions (center) FIG. 2 18
"t" for all top positions FIG. 2 17
The vowels are:
"a" for reference head FIG. 2 14
"e" for reference head FIG. 2 13
"i" for reference head FIG. 2 16
"o" for reference head FIG. 2. 15

Figure 5:
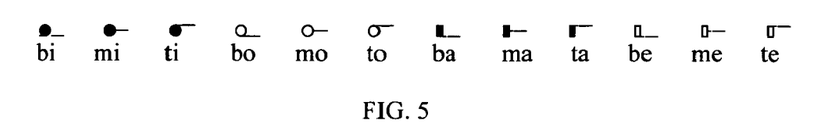
FIG. 5 illustrates the twelve names of the pitches.

Using this method the symbolic combination generate the names, and names generate representation, same pitches are discriminated by being aware of the series they belong, the twelve names of the basic pitches are shown in FIG. 5

There is a row that always crosses one of these series, by default between FIG. 1 6 and 7 pitches, the crossed series is the reference series, and the remaining series will be up and down of it.

Figure 3:
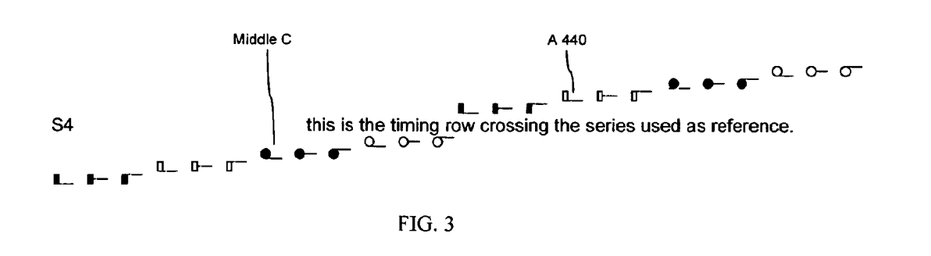
FIG. 3 illustrates two series and the timing row crossing the central pitch series.

This row can be moved to cross any series to accommodate the different musical instruments range to preferably be represented around it, this is the timing row and by default it will cross the middle series, which is where the middle C and A 440 belong FIG. 3; this series is indicated with S4 to keep compatibility with the scientific pitch notation, S5 is the next series above and S3 is the previous one. Any indication of changing the reference series remains until there is a new indication.

Figure 4:
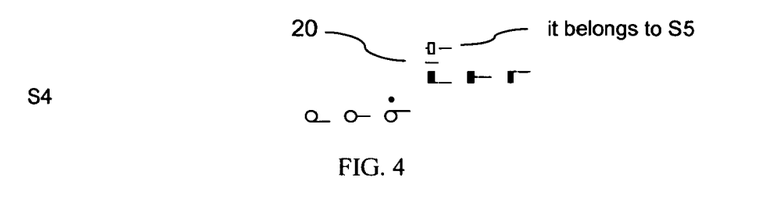
FIG. 4 illustrates the optional pitch series separators.

Individually we can indicate the series that some notes belong by inserting small lines FIG. 4. 20, this are series separators that apply only to the notes in the same vertical axis, used for faster association or to compact information. Also the unison interval may be represented by placing adjacent representation of the same note where they do not interfere with previous note traces.

The absence of note traces in the vertical axis at a given moment means silence; sometimes the silence is treated as a meaningful element in music and is called Rest.
This is how to name the musical intervals.

The relation between two pitches is considered a musical interval; traditionally their names have been determined by counting the number of degrees plus further qualification, in the present invention the names of the musical intervals are determined only by the relationship of two note traces positions in their reference heads.

The four reference heads will always be in the same order as shown in FIG. 2, this sequence or pattern is repeated up and down to cover the whole musical range, every note is in one of the three reference heads positions, bottom, center or top; the relationship between two notes positions in their reference heads is used to name the musical intervals.

A note can be in the same position, next position or alternate position in reference to another one. When the notes are in the same position it does not matter whether the interval is descending or ascending the relationship is the same, but when they are in different positions conventionally for ascending intervals next position is the one above, e.g. center is next to bottom, top is next to center and bottom is next to top. For descending interval next position is the one below, e.g. center is next to top, bottom is next to center and top is next to bottom.

The alternate position is after next in any direction. It does not matter the distance or amount of space between notes, whether they belong to the same series or not, this relationship is the same.

The names of the intervals begin with a consonant:
"s" when the two notes are in the same position
"n" for notes in the next position
"l" for notes in the alternate position These consonants are followed by a vowel to discriminate all the intervals with the same relationship: "a" for the smallest interval (closer), "e" for the next one with the same relationship, "i" for the next one and "o" for the farthest within the series. To name the compound intervals (greater than a series) the same method is applied and the vowel is repeated, e.g. sa is for unison or repetition of the note and saa is one series away, the equivalent of the octave.

Figure 6:
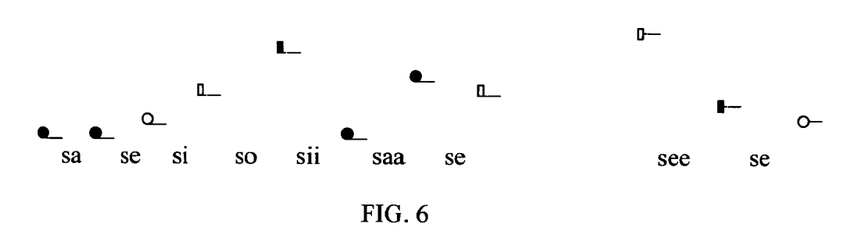
FIG. 6 is an exemplary illustration of melodic intervals which are in the same position.
Figure 7:
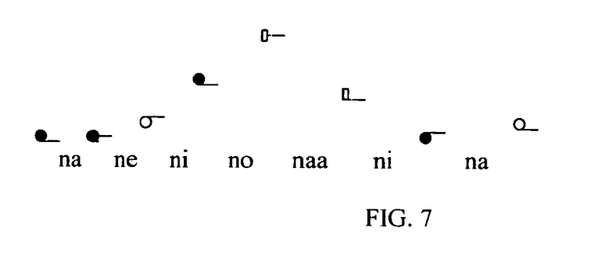
FIG. 7 is an exemplary illustration of melodic intervals which are in the next position.
Figure 8:
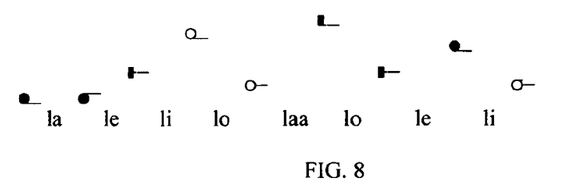
FIG. 8 is an exemplary illustration of melodic intervals which are in the alternate position.

FIG. 6 illustrates examples of melodic intervals where the notes are in the same position FIG. 7 illustrates examples of melodic intervals where the notes are in the next position FIG. 8 illustrates examples of melodic intervals where the notes are in the alternate position Whether the interval is ascending or descending, melodic or harmonic using this method same intervals have the same name. This method provides an easy, exclusive and consistent way to identify and name any musical interval in real time independently of scales or tonality.

Also determining one of this symbols represent the repetition (sa) the others of the sequence will also represent the intervals instead of the pitches.

This is how to name the degrees of the scales.

Naming all the intervals in reference to any same pitch, provides a relative different name for every degree of the twelve note series; this relative relationship is used to identify all the degrees of any possible scale using all or some of the twelve notes of the series.

To name the degrees of the scales the same method that was used to name the intervals will be used but to differentiate them from intervals the consonants used will be different "d" for notes in the same position from identical instead of "s".

"f" for notes in the next position from following instead of "n".

"p" for notes in the alternate position from previous instead of "l".

Figure 9:
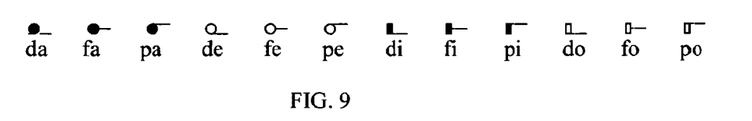
FIG. 9 illustrates all possible names of the scales degrees.

The sequence in FIG. 9 illustrates the names of the intervals between each note and the one in FIG. 1 1, the degree "da" is a possible center or tonic in a scale, as a sequence this names are the names of the degrees of the scales, with them we can form any scale, they will be the same for all the tonalities, starting with any pitch the sequence of names or relationship is the same.

Figure 17:
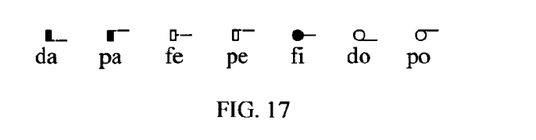
FIG. 17 illustrates the names of the degrees of the mayor scale

FIG. 17 illustrates the names of the degrees in a mayor scale starting with pitch "ba".

Also determining one of this symbols represent the tonic (da) the others of the sequence will also represent the degrees of the scale instead of the pitches.

Method to help identify the musical intervals, degrees of the scales or pitches.

As a consequence of the concord between the 12-TET, representation and the support provided in the present invention to identify and name the elements of the harmonic structure of music which facilitates, simplifies and emphasizes the use of intervals and degrees of scales as well as the traditional focus on pitch in the musical practice, a method is provided to help identify these elements and associate them with their respected given names or symbols by dynamically changing the timbre of a controllable musical instrument while playing.

As it is easy for us to differentiate a piano from a trumpet, the dynamic change of the timbre while playing based on previously selected criteria give us certainty of the occurrence of the interval, degree of the scale or pitch selected to be identified.

In a controllable electronic or software based musical instrument which has the possibility of playing a variety of distinctive timbres, it will be selected the main timbre using the program interface of the computer which is controlling the instrument or through the device own interface, the main timbre will play most of the notes and through the same interfaces it will be selected a secondary timbre which will play only those notes that match the criteria also previously selected in the same interfaces.

As an example we want to identify by this method the occurrence of the interval "na" (a second minor) while playing ascending the mayor scale in this controllable instrument starting with the note "bi" (C).

First we select the timbre of a piano as the main timbre of the instrument, then select the timbre of a trumpet as the secondary timbre and then select intervals as the element and then select "na" to be identified by playing the secondary timbre.

Press the key of "bi" and it will play as a piano then press the key of "ti" (D) and it will play as a piano again, then press the key of "mo" (E) and it will play as a piano then press the key of "to" (F) and it will play as a trumpet because a "na" interval has occurred, then press the key of "ma" (G) and it will play as a piano again, going backward it will play as a trumpet again when pressing the key of "to" and next the key of "mo".

The same method may be used to identify the degrees of scales, the musical pitches or even chords selecting them as the element to be associated to the secondary timbre.

This method is also applied when the controllable instrument is commanded by the output of a sequencer or digital file.

The audio output of the instrument may be recorded or an audio file may be created in any format and played back as an ear training method.

The main and secondary timbres may be selected from a wide variety of instruments, first using very distinctive timbres and later very similar ones until both main and secondary are the same and the trainee is still able to perceive the element.

This is how to name the chords.

The names of the musical chords are determined by concatenating the names of the musical intervals or scale degrees or pitches to form words that will be the names of the chords, there are several possible methods to name the same chord:

1—All the names of the intervals will be in reference to the same pitch that is part of the chord.

Figure 11:
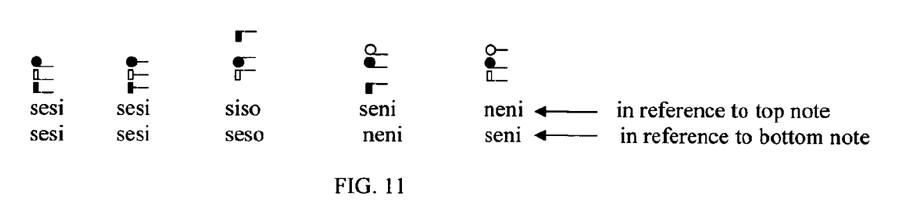
FIG. 11 is an exemplary illustration of chord names concatenating intervals referent to the same pitch.

FIG. 11 illustrates examples where the intervals are in reference to the bottom or top note of the chord.

2—All the names of the intervals will be in reference to the adjacent pitches of the chord.

Figure 10:
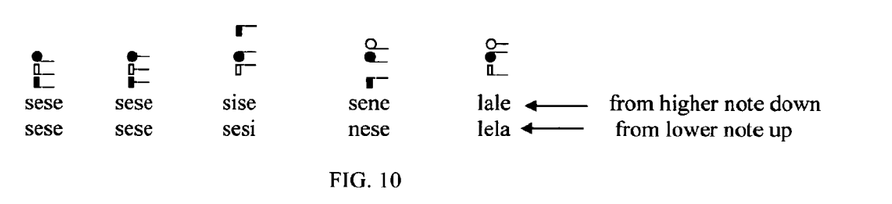
FIG. 10 is an exemplary illustration of chord names concatenating adjacent interval names.

FIG. 10 illustrates examples where the intervals are in reference to the adjacent notes of the chord in both directions.

3—Concatenating the names of the scales degrees.

4—Concatenating the names of the pitches.

Besides being isolated entities, chords have a relationship between them, also with melodic intervals, scale degrees, and absolute pitches. Making a combination of chord relationship and chord names plus the use of melodic interval names we have a method for encoding music that provides robust support for theoretical analysis of music.

The format for encoding will be (relationship-chord name), when using method number 3 the name of the chord provides also a relative relationship because all interval names are in reference to the same pitch. The relationship may be the name of a pitch, name of a scale degree or name of selected interval in reference to previous note To differentiate the different methods some conventionalism will be used.

For the chords:
1—An "a" will be put before the name to indicate that the intervals are all referent to the same pitch and an "e" when they are in reference to the next adjacent, this vowels can be put only once and remains until there is a new indication.
2—The first letter in upper case indicates that the upper note is the reference and lower case indicates that the lower note is the reference in any of the above cases.

For the relationships:
1—When the relationship is in reference to a degree the degree names will be used and when they are in reference to the previous notes the interval name will be used.
2—When the relationship is in reference to previous note; the first letter in upper case indicates that the interval is between upper notes and the first letter in lower case indicates that the interval is between lower notes.

This is how to represent timing in music.

In order to have a closer relation between representation and codification of music, besides achieving a more accurate timing representation, the representation of the notes attack or note-on and the representation of the release of the notes or note-off will be independent.

We keep track of time in music with the help of a unit of reference called beat. The beginning of this beat is notable, it is the easier moment to identify in music; it is the very moment when the metronome ticks or our foot taps the floor. This moment indicated in FIG. 12 23 coincide with the first note(s)-on or Rest event right after the FIG. 12 21 symbol in the timing row; this symbol represents the reference to the first note(s)-on or Rest of the beats.

Figure 16:
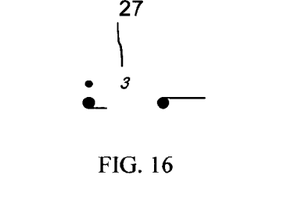
FIG. 16 is an exemplary illustration of a mute note-on at the beginning of the beat

The Rest will be considered a mute note-on (and hereafter included in the term note-on) because note-on references will make reference to them also, FIG. 16 27 represents a 30% mute note-on at the beginning of the beat.

A mute note-on is an indicated note-on event but no note is actually started, this remarks the difference between possible periods of silence between notes and mute notes-on which are treated as meaningful elements.

The symbols that represent the note-on events are placed in the timing row and refer to the next position or event after them in the horizontal axis. The last note(s)-on of a beat coincide with the position in the vertical axis of the symbol illustrated in FIG. 12 21, in this last position we don't need to know what amount or percent of time remains until the end of the beat because the beginning of the beat is the known reference to us, it may represent a fraction of the beat or all the time of the beat.

Figure 12:
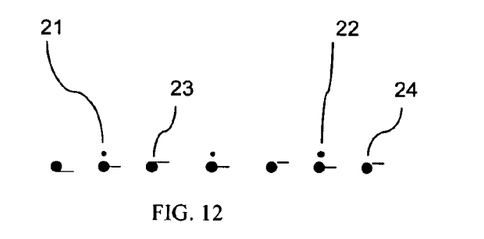
FIG. 12 illustrates the symbols used to represent the beginning of beats and beginning of measures.

Same symbol but bigger FIG. 12 22 is the reference to the first note(s)-on of the next measure indicated in FIG. 12 24; it also represents any amount of time remaining to the beginning of the next measure's first beat. The note-on or beginning of sound is the left side of the note trace.

The remaining note(s)-on references other than the first of the beat are represented by the ten digits 0 to 9, this digits represent a percent of the time elapsed between the beginnings of adjacent beats.

Each digit represents a main value plus a range of encapsulated percent values around their main. Placing an underscore adds 5% to any of them, e.g. 9=95%, represents also 93%, to 99%. Then 0=5%, 1=10%, 2=20%, 3=30%, 4=40%, 5=50%, 6=60%, 7=70%, 8=80, 8=85%, 9=90%

Figure 13:
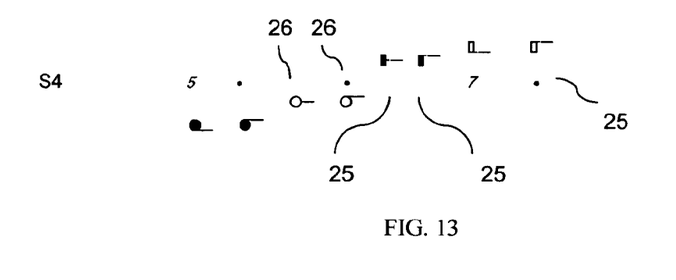
FIG. 13 is an exemplary illustration of omitting the note-on reference symbols

To simplify representation specially handwritten we can omit all the note-on reference symbols in a beat except the last one or make a combination of symbols and omissions. In any case the value of the note-on references omitted is the result of dividing the total of the percent of time of the notes-on without indication by the number of those notes-on in the beat including the last one, e.g. if there are two notes-on without indication it will be 50% each FIG. 13 26, if there are four notes-on but one of them has a 70% symbol the other three will be 10% each FIG. 13. 25

Figure 14:
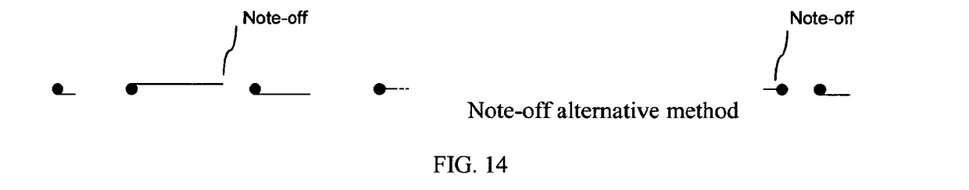
FIG. 14 is an exemplary illustration of the alternative method of representing the note-off

Note-off or end of sound, is represented by the end of the note trace, or alternatively by placing one or two dots after a short note trace indicating that it continues hidden, and reappearing very close to where it ends, preferably with the reference head at its right side, this is to avoid long lines or to continue down or in another page FIG. 14.

The distance between the note-on events has no meaning and is placed by convenience but the position of the note-off is meaningful because the length of the note trace is a relative or proportional representation of the time the note sounds with respect to the next note-on before which it ends.

Figure 15:
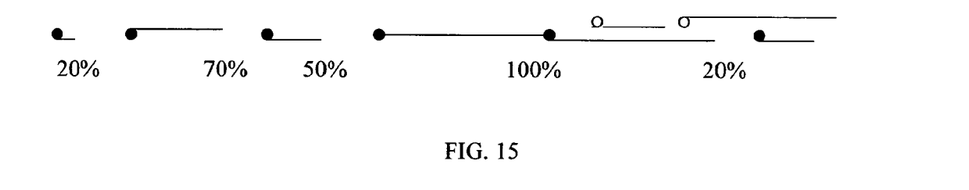
FIG. 15 is an exemplary illustration of the proportional representation of the duration of sound

The segment of the note trace that is between the two notes-on where the note-off is, proportionally represents a percent of the time elapse between those notes-on, it is a graphical way of representing percent, in FIG. 15 are indicated the percent represented by the note traces.

The distance between the note-on events where the note-off occurs is equivalent to 100% of the time that is used to determine the relative position of the note-off or end of the line.

Note-on references, refer to next note(s)-on that make contact with the reference heads, very close notes-on like guitar strokes, fast arpeggio or spread out chords their note traces are proportionally separated from the reference heads.

This is how to indicate measures and tempo.

The number of beats in a measure is optionally indicated by M# e.g. M4 is four beats. Also combinations of different amount of beats may be indicated, e.g. M2,3 means alternating one measure of two and one of three beats.

The absolute value of the time elapsed between beats sets the relative speed at which music should be played and is called Tempo. Using T=60 means the absolute value between one beat and the next one is 1 second, as tempo may change any time and any value we'll also use a relative reference to the previous indication T+10 or +10 means adding to the previous indicated 60+10 is T=70 which will result in a faster tempo or −35 which will be very slow as a delay, in this way we can represent the fermata accurately. T will restore the last absolute value indicated.

This is how to represent dynamics.

Dynamics refers to the changes of volume of notes or sound. Dynamic indications are always relative values between the minimum and maximum possible for each instrument.

The loudness of individual notes will be optionally represented by small vertical or leaned lines touching or close to the note traces that proportionally represent the range of maximum and minimum values. In chords or segments of music, dynamics will be alternatively represented using the same symbols used to represent the note-on references but out of the timing row.

They should be placed upper when increasing and lower when decreasing in reference to the previous indications, this is for visual help.

This is how to represent the micro tonality.

Quarters of tones will be represented by separating the reference heads a litter bit to allow one more line between them, these new lines will be in the center positions of another four different reference heads pattern, the lower part of this new reference heads will have the same color (hollow or solid) and shape of the previous reference heads below them and the upper part will be of the same color of the one above them.

The top positions of these new reference heads will be intercalated between the bottom and center positions of the basic reference heads. The bottom positions of these new reference heads will be intercalated between the top and center positions of the basic reference heads.

Method for representing the correlation between the reference heads and some musical instruments.

One of the main advantages of patterns of reference heads over staves of lines and spaces is that they have a meaning as stand-alone symbols and there is no need to use letters, numbers, names, tablatures or any other symbols as intermediate to represent pitch independently, they are a direct representation of it.

This is especially of great value to provide assistant to performers especially of keyboards and string instruments by printing these reference heads somewhere related to the keys or positions that generate the pitch that these reference heads represent when the note trace is in their center position, so that adjacent notes are at their sides.

Figure 20:
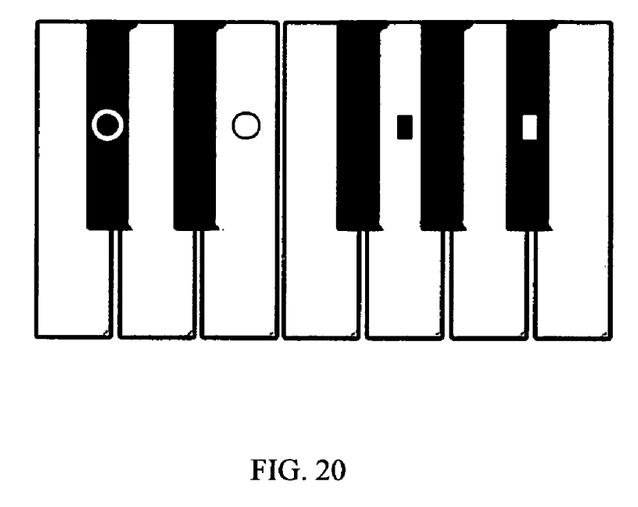
FIG. 20 illustrates part of a standard piano keyboard layout representing the correlation with the reference heads printed on the keys.
Figure 22:
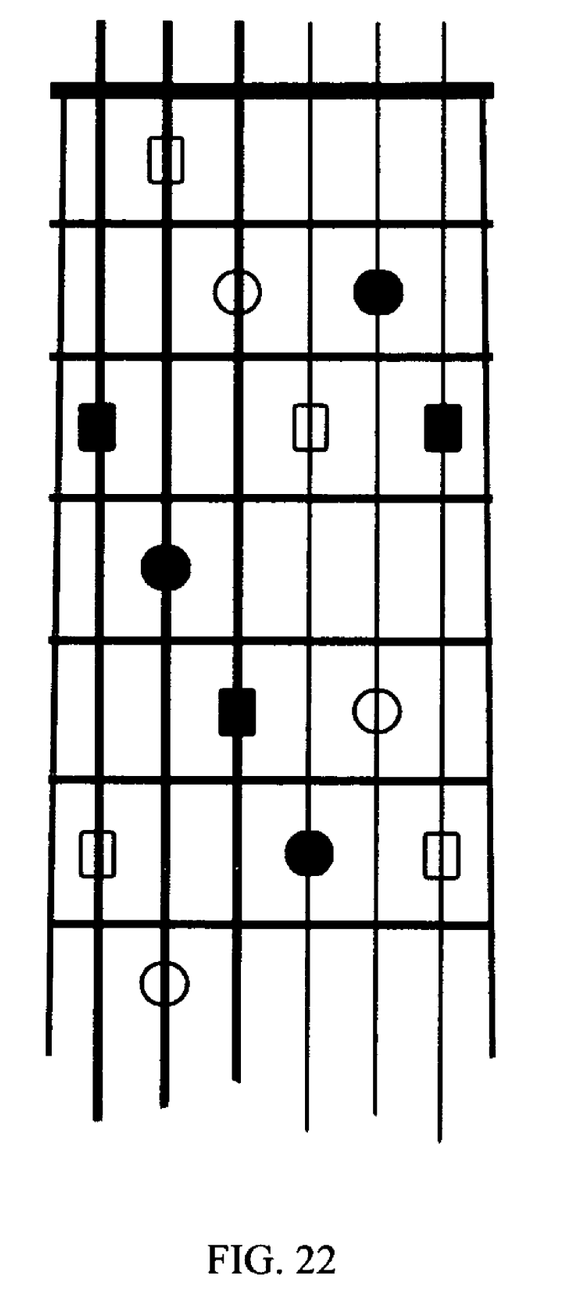
FIG. 22 illustrates part of a guitar fret board representing the correlation with the reference heads printed on the strings positions.

The color used for the reference heads is not relevant and may be selected according to the background of the instrument, keeping the hollow and solid differentiable, e.g. yellow represent hollow and purple represent solid The border of these printed reference heads should be in the apposite color e.g. a round solid reference head will have a white border, FIG. 20 is an example in the piano keyboard, and FIG. 22 is another example of the use of reference heads on the positions of the string instruments, it illustrates a section of a guitar fret board.

For instruments with a keyboard, another method to represent the correlation of the reference heads and the keys is used; making groups of three keys in adjacent positions and associating them with the color or shape of the reference heads, the central key of the group will correlate with the associated reference head when the note trace is in the center position.

Figure 18:
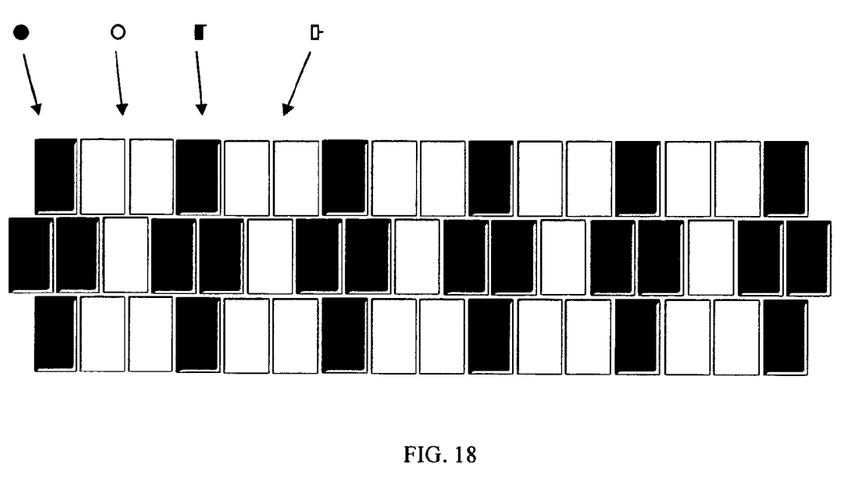
FIG. 18 illustrates part of a janko keyboard layout representing the correlation with the reference heads using color.
Figure 19:
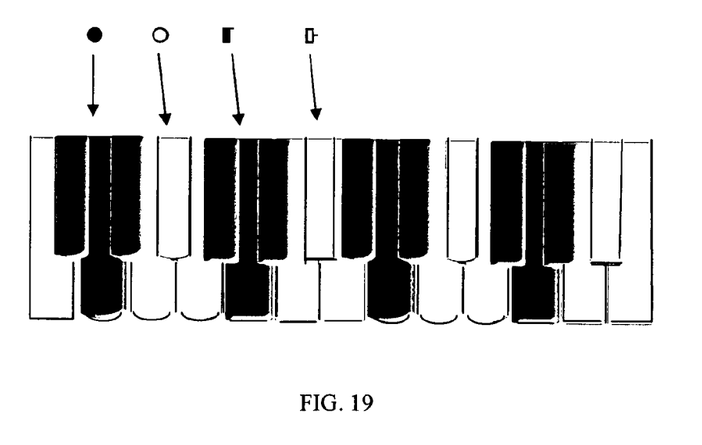
FIG. 19 illustrates part of a uniform 6-6 keyboard layout representing the correlation with the reference heads using color and shape.
Figure 21:
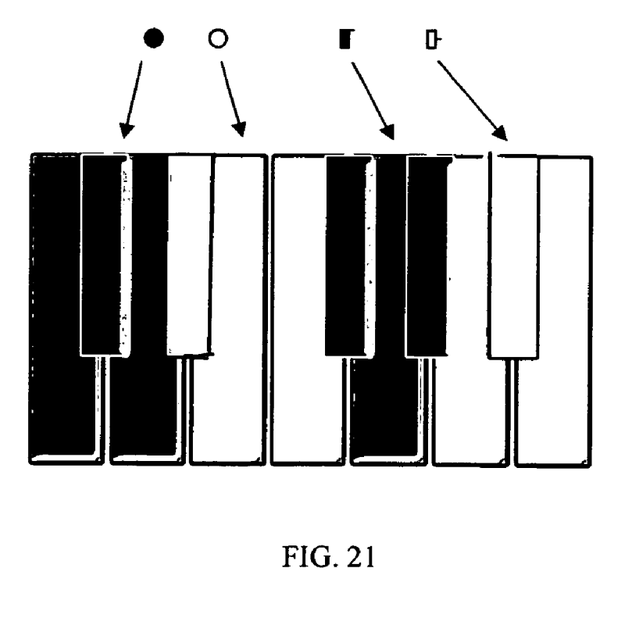
FIG. 21 illustrates part of a standard piano keyboard layout representing the correlation with the reference heads using color.

These methods apply to all types of keyboards; some examples are sections of popular layouts like the standard piano FIG. 21, a uniform keyboard 6-6 FIG. 19 and a janko keyboard FIG. 18.

The present invention has been conceived to be used as a personal stenographic system, notation and computer's high level language for music of which its fundamental and common novel ideas have been disclosed and claimed in a music notation embodiment, the details of how this ideas will be used in every embodiment and the computer high level language extension are beyond the purpose of this patent and will be explained in a book and upcoming computer programs, as well as a look at our musical language through this system.

It is up to the people skilled in the art of music to realize how important it is to provide a proprietary representation and theoretical support to the 12-TET tuning system to be able to continue with the necessary simplification of the musical practice as well as the new possibilities that it opens.

The invention claimed is:

1. A method for producing a fully functional reference head music notation system comprising the steps of:
    (a) providing a computer readable medium having a music reference head notation program stored thereon, associated with a computer, said computer having an input interface for receiving musical notes data;
    (b) inputting musical notes data into said interface;
    (c) providing a plurality of reference heads for reference head notation in which said computer associates with musical notes data, said reference heads having different positions in an output displaying vertical or horizontal axis of said reference head notation;

(d) naming musical intervals according to the relationship of the positions of said musical notes in the discriminatory element of a music notation system, comprising the steps of:

providing an element to discriminate the musical notes;

determining if said musical notes are in the same, next or previous positions of said discriminatory element; and applying a plurality of consonants and vowels to have an exclusive name for each said musical interval;

(e) correlating said musical notes data with said reference heads by said computer;

(f) transforming said musical notes data into said reference head notation; and (g) outputting from said computer, a visual output of said reference head notation.

2. A method according to claim 1, wherein said musical notes data is Standard Music Notation, MIDI files, encoding music systems, digital music files, or combinations thereof.

3. The visual representation of the elements of the harmonic structure of music using the method as claimed in claim 1.

4. A set of symbols generated by the output of the method as claimed in claim 1.

5. The method of claim 1, further comprising a method for representing the visual correlation between said musical notes~and the keys or positions that generate said musical notes on said musical instruments, comprising the steps of:

(a) providing a pattern of reference heads;

(b) determining groups of three keys or positions in said musical instruments;

(c) correlating said reference heads and said groups of keys or positions; and (d) representing some or all of said correlations in the musical instruments.

6. The method of claim 5, wherein said correlating is represented by printing said reference heads.

7. The method of claim 5, wherein said correlating is represented by associated color of said reference heads.

8. The method of claim 5, wherein said correlating is represented by associated shape of said reference heads.

9. The method of claim 1, further comprising a method for visually representing the musical timing on said computer of said musical notes, comprising express relative indications of when the notes should play and separate indication of how long said musical notes should play.

10. The method of claim 9, for indicating when said musical notes should be played comprising the steps of:

(a) providing a plurality of symbols indicating the relative values of when the notes should be played; and (b) determining one of said indications represents any possible value of the time remaining to the beginning of the next beat.

11. The method of claim 9, for indicating how long the notes should play comprising the steps of:

(a) providing a trace representing a musical note;

(b) determining the distance between the beginning of said musical note and the beginning of the next note represents 100% of the time elapsed between said notes' beginnings; and (c) adjusting the length of the first said musical note to indicate its duration as a percent of the time elapsed between said two beginnings.

* * * * *